United States Patent Office 2,815,894
Patented Dec. 10, 1957

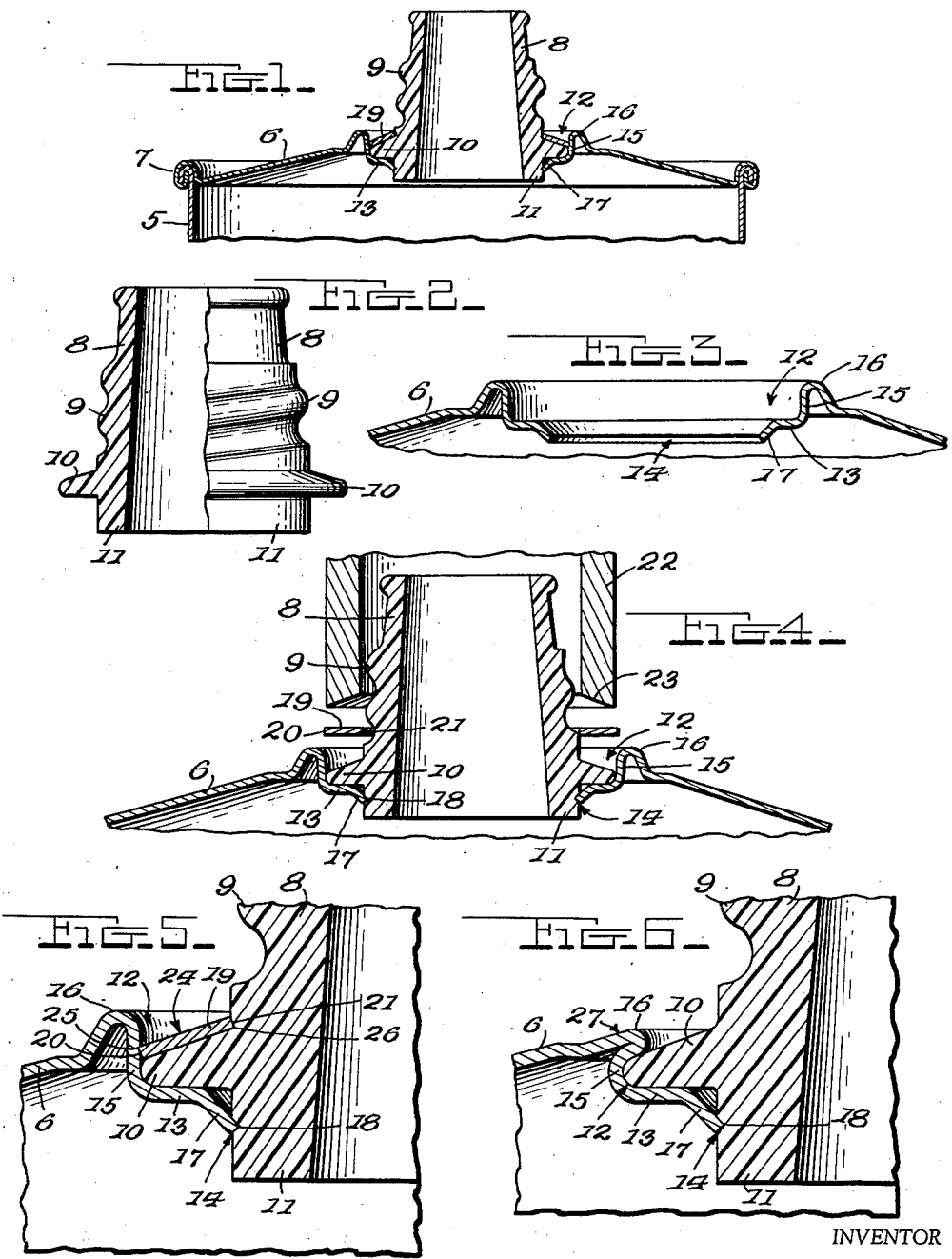

2,815,894

PLASTIC NOZZLE OR SPOUT MOUNTING AND METHOD OF FORMING SAME

John Henchert, River Forest, Ill., assignor to Continental Can Company, Inc., New York, N. Y., a corporation of New York Application April 22, 1955, Serial No. 503,282

11 Claims. (Cl. 222—566)

The invention relates generally to metallic receptacles and primarily seeks to provide a novel plastic nozzle mounting on a metal can top or breast wherein the nozzle is given a sturdy support, liquid tight and secure against turning when a closure cap is threaded thereon.

An object of the invention is to provide a nozzle mounting of the character stated wherein the plastic nozzle includes a tubular body, a mounting flange projecting outwardly therefrom and a cylindrical base portion depending below the flange, the flange being pressed in sealing contact on an annular seat surrounding a nozzle base portion receiving opening and forming the floor of a mounting recess in which the flange is received, and there being included an annular anchoring means extending over the flange and firmly pressed thereagainst for securing the flange in the recess and in sealing contact against the seat.

Another object of the invention is to provide a novel nozzle mounting of the character stated wherein the nozzle base portion receiving opening defining edge is downwardly and inwardly bevelled toward the interior of the container and is indented into the nozzle base portion.

Another object of the invention is to provide a novel nozzle mounting of the character stated wherein the annular anchoring means comprises a metal ring having an outer edge engaging in the recess and an inner edge biting into the body of the nozzle.

Another object of the invention is to provide a novel nozzle mounting of the character stated wherein the annular anchoring means comprises a fold of the mounting wall turned inwardly over and against the nozzle flange.

A further object of the invention is to provide a novel method of forming the mounting wherein the nozzle base portion is forced into the receiving opening in the mounting recess, being deformed in the process so as to bring about an indenting or biting of the opening defining edge in the nozzle base portion with the nozzle flange firmly pressed against the annular seat surrounding the opening, and then the annular anchoring means is applied over the flange to securely hold the same in sealing contact on the seat.

A still further object of the invention is to provide a novel method of forming the mounting wherein the recess is defined in part by an upstanding annular wall and the annular anchoring means is in the form of a flat ring having an inner diameter for closely fitting over the nozzle body and an outer diameter slightly larger than the inner diameter of the annular wall, the method including the step of forcing the ring into the recess while dishing the same against the annular wall, thereby to cause the ring to conform to the flange against which it is forcibly pressed, and the outer and inner edges of the ring to bite respectively against the annular wall and the body of the nozzle.

With the above and other objects in view that will hereinafter appear, the nature of the invention will be more clearly understood by reference to the following detailed description, the appended claims and the several views illustrated in the accompanying drawings.

In the drawings:

Figure 1 is a fragmentary vertical cross section through the top portion of a can structure embodying the improved plastic nozzle mounting.

Figure 2 is a detail view illustrating the nozzle partly in side elevation and partly in vertical cross section.

Figure 3 is an enlarged fragmentary sectional view illustrating the nozzle receiving recess prior to the mounting of the nozzle therein.

Figure 4 is a view similar to Figure 3 showing the nozzle forced into position on the recess, the anchoring ring being shown immediately above the entrance into the mounting recess, and a ring reshaping or dishing tool being shown in position above the ring.

Figure 5 is an enlarged fragmentary sectional view illustrating the completed mounting of the form shown in Figures 1 through 4.

Figure 6 is a view similar to Figure 5 illustrating a modified arrangement in which the bight through which the recess defining annular wall merges into the top or breast of the can is folded inwardly over and downwardly against the nozzle flange as an annular anchoring means.

In the example of embodiment of the invention herein disclosed, the improved nozzle mounting is incorporated in a container including a body 5 having a top or breast 6, secured thereon by a conventional double seam 7. The nozzle to be mounted preferably is molded from a deformable, resilient plastic, such as polyethylene, to include a tubular body 8 externally threaded at 9 and having an outwardly directed mounting flange 10 and a cylindrical base portion depending below the flange in the manner clearly illustrated in Figure 2.

The container top or breast 6 comprises a mounting wall and is provided with a mounting recess generally designated 12 and having a floor or annular seat 13 surrounding the nozzle base portion receiving opening 14, and an annular wall 15 rising from the seat, as shown in Figure 3. At its upper extremity, the annular wall 15 merges through a downwardly opening curved bight 16 into the main body of the top or breast. The edge defining the opening 14 is downwardly and inwardly bevelled as at 17 so that when the nozzle base portion 11 is forced therethrough as illustrated in Figure 4, the edge of the opening will become indented or embedded in the nozzle base portion as indicated at 18.

In the preferred form of mounting, after the base portion 11 of the nozzle has been forced into the receiving opening 14 to place the nozzle flange 10 firmly against the annular seat 13 the flat anchoring ring 19 is placed over the nozzle body at the entrance into the mounting recess as shown in Figure 4. The ring preferably is formed flat and is of the order of .015 inch in thickness, presenting an outer edge 20 and an inner edge 21. The outer edge 20 has a diameter slightly larger than the internal diameter of the annular upstanding wall 15 of the recess, and the inner diameter of the ring is dimensioned to provide a close but free fit over the external surface of the nozzle body 8.

In utilizing the ring 19 as an anchoring means for securing the nozzle in its mounting, a tubular tool 22 having an end flare 23 corresponding to the downward and outward slope of the upper surface of the nozzle flange 10 is employed to force the ring into the receiving recess. This forcing of the ring into the recess defined by the rigid wall 15 having an internal diameter slightly less than the outer diameter of the ring, causes the ring to dish upwardly in the manner indicated at 24 in Figure 5, the outer ring edge 20 biting into the wall 15 at 25 and the inner edge 21 of the ring biting into the external surface of the nozzle body as at 26. The ring is also reshaped to conform to the whole upper surface of the nozzle flange 10, and thus anchored in the recess serves to press and secure the flange in tight sealing contact against the annular seat 13. The mounting thus effected not only serves to provide a very efficient seal at the indented edge 18 and over the downwardly presented face of the flange 10 against the annular seat 13, but it also provides a mounting in which the plastic nozzle is secured against turning relative to the top or breast 6 when a closure cap is threaded thereon.

In the form of the invention illustrated in Figure 6 the top or breast bight 16 is folded inwardly over and against the nozzle flange at 27 to press the flange into sealing position and secure the nozzle in its mounting, liquid tight and secure against rotation relative to the top 6.

While example disclosures of the nozzle mounting and method of forming the same are made herein, it is to be understood that variations in the structural details and method procedure may be provided without departing from the spirit and scope of the invention as defined in the appended claims.

I claim:

1. In a container structure, a plastic nozzle comprising a tubular body including a mounting flange projecting outwardly therefrom and a cylindrical base portion depending below the flange, and a metal mounting wall having a mounting recess therein providing an annular seat surrounding a nozzle base portion receiving opening, said mounting flange being seated on said seat with the nozzle base portion forced into said opening and indented by the seat edge defining the opening, and there being included an annular anchoring means extending over and firmly pressed against said flange and serving to securely press the flange against the seat and hold the same in sealing contact on said seat.

2. In a container structure, a plastic nozzle comprising a tubular body including a mounting flange projecting outwardly therefrom and a cylindrical base portion depending below the flange, and a metal mounting wall having a mounting recess therein providing an annular seat surrounding a nozzle base portion receiving opening, said mounting flange being seated on said seat with the nozzle base portion forced into said opening and indented by the seat edge defining the opening, and the seat edge defining the nozzle base portion receiving opening being downwardly and inwardly bevelled toward the interior of the container so as to bite into the nozzle base portion as a frusto-coniform edge portion, and there being included an annular anchoring means extending over and firmly pressed against said flange and serving to securely hold the same in sealing contact on the annular seat.

3. Container structure as defined in claim 1 wherein the annular anchoring means comprises a fold of the mounting wall folded upon itself inwardly over and against the nozzle flange.

4. Container structure as defined in claim 1 wherein the annular anchoring means comprises a metal ring having an outer edge engaging in the recess and an inner edge biting into the body of the nozzle.

5. Container structure as defined in claim 1 wherein the nozzle flange slopes outwardly and downwardly toward the base portion bearing end of the nozzle, and wherein the annular anchoring means comprises a metal ring dished to conform to and firmly press against the whole sloping surface of the flange and engaging at its outer and inner edges respectively in said recess and against the body of the nozzle.

6. In a container structure, a plastic nozzle comprising a tubular body including a mounting flange projecting outwardly therefrom and a cylindrical base portion depending below the flange, and a metal mounting wall having a mounting recess therein defined by an annular wall merging into an annular seat surrounding a nozzle base portion receiving opening, said mounting flange being seated on said seat with the nozzle base portion forced into said opening and indented by the seat edge defining the opening and there being included a nozzle anchoring ring pressed firmly over and against the nozzle flange and having inner and outer edge portions indented in the nozzle body and the annular wall respectively so as to securely anchor the nozzle flange in tight sealing contact on its seat.

7. Container structure as defined in claim 6 wherein the seat edge defining the nozzle base portion receiving opening is downwardly and inwardly bevelled toward the interior of the container so as to bite into the nozzle base portion as a frusto-coniform edge portion.

8. Container structure as defined in claim 6 wherein the outwardly directed face of the nozzle flange slopes outwardly and downwardly toward the interior of the container and the anchoring ring is dished to snugly engage the flange over the whole of its sloping surface.

9. The herein described method of providing a mounting for a deformable plastic nozzle having a tubular body, a mounting flange projecting outwardly from the body and a cylindrical base depending below the flange; said method comprising, providing a metal container wall with a circular edge defined receiving opening surrounded by an annular seat in turn surrounded by an upstanding annular wall, forcing the nozzle base portion through the receiving opening to firmly seat the flange of the nozzle on the annular seat and cause the receiving opening defining edge to be embedded in the nozzle base portion beneath the flange, placing a metal ring having concentric inner and outer edges about the nozzle body and over the flange within the upstanding annular wall, and reshaping the ring to cause its outer and inner edges to bite into the annular wall and the spout body respectively and secure the ring firmly against the flange and the flange securely against its seat.

10. The herein described method of providing a mounting for a deformable plastic nozzle having a tubular body, a mounting flange projecting outwardly from the body and a cylindrical base depending below the flange; said method comprising, providing a metal container wall with a circular edge defined receiving opening surrounded by an annular seat in turn surrounded by an upstanding annular wall, forcing the nozzle base portion through the receiving opening to firmly seat the flange of the nozzle on the annular seat and cause the receiving opening defining edge to be embedded in the nozzle base portion beneath the flange, placing about the nozzle body and over the flange thereof a thin flat metal ring having concentric inner and outer edges with the outer edge slightly larger than the inside diameter of the upstanding annular wall and the inner edge slightly larger than the outside diameter of said body, and dishing the ring against said wall to press it firmly against the body flange and said flange firmly against its seat and cause the outer and inner ring edges to respectively bite into said wall and said nozzle body and secure the flange on its seat.

11. The herein described method of providing a mounting for a deformable plastic nozzle having a tubular body, a mounting flange projecting outwardly from the body and a cylindrical base depending below the flange; said method comprising, providing a metal container wall with a circular edge defined receiving opening surrounded by an annular seat in turn surrounded by an upstanding annular wall, forcing the nozzle base portion through the receiving opening to firmly seat the flange of the nozzle on the annular seat and cause the receiving opening defining edge to be embedded in the nozzle base portion beneath the flange, and folding said annular wall over and against the nozzle body flange to firmly press and secure it against its seat.

References Cited in the file of this patent

UNITED STATES PATENTS

| 929,974 | McNutt | Aug. 3, 1909 |
| 2,168,607 | O'Brien | Aug. 8, 1939 |

FOREIGN PATENTS

| 129,868 | Austria | Apr. 15, 1932 |